US011021174B2

(12) United States Patent
Grzona et al.

(10) Patent No.: US 11,021,174 B2
(45) Date of Patent: Jun. 1, 2021

(54) RAIL VEHICLE HAVING A COVERED BOGIE

(71) Applicant: SIEMENS MOBILITY GMBH, Munich (DE)

(72) Inventors: Andreas Grzona, Straelen (DE); Martin Krause, Rheinberg (DE); Thomas Weiss, Munich (DE)

(73) Assignee: Siemens Mobility GmbH, Munich (DE)

( * ) Notice: Subject to any disclaimer, the term of this patent is extended or adjusted under 35 U.S.C. 154(b) by 295 days.

(21) Appl. No.: 16/070,797

(22) PCT Filed: Dec. 16, 2016

(86) PCT No.: PCT/EP2016/081383
§ 371 (c)(1),
(2) Date: Jul. 18, 2018

(87) PCT Pub. No.: WO2017/129317
PCT Pub. Date: Aug. 3, 2017

(65) Prior Publication Data
US 2019/0023287 A1   Jan. 24, 2019

(30) Foreign Application Priority Data
Jan. 27, 2016 (DE) .......................... 102016201154.5

(51) Int. Cl.
*B61D 17/02* (2006.01)
*B61D 49/00* (2006.01)

(52) U.S. Cl.
CPC ............. *B61D 17/02* (2013.01); *B61D 49/00* (2013.01); *Y02T 30/00* (2013.01)

(58) Field of Classification Search
CPC ...... B61D 17/02; B61D 49/00; B61D 27/009; B61D 27/0018; B61D 27/00; Y02T 30/32; B61C 17/04; B61C 3/00; B61C 17/00; B61C 9/38; B61C 9/50
See application file for complete search history.

(56) References Cited

U.S. PATENT DOCUMENTS

| | | | |
|---|---|---|---|
| 1,160,715 A * | 11/1915 | Howell | ..................... B61F 5/36 105/82 |
| 5,735,215 A | 4/1998 | Tegeler | |
| 9,908,538 B2 | 3/2018 | Kreuzweger et al. | |
| 2014/0260403 A1* | 9/2014 | Connell | ............... B60H 1/3202 62/323.1 |

FOREIGN PATENT DOCUMENTS

| | | |
|---|---|---|
| DE | 102004041090 A1 | 3/2006 |
| DE | 102008045952 A1 | 3/2010 |
| EP | 2952404 A1 | 12/2015 |

(Continued)

*Primary Examiner* — Mark T Le
(74) *Attorney, Agent, or Firm* — Laurence Greenberg; Werner Stemer; Ralph Locher

(57) ABSTRACT

A rail vehicle has a bogie, which is covered in such a way that a bogie cavity exists, which is formed in the under floor region of the rail vehicle by a cover assembly and walls adjacent to the bogie. A device for producing pressurized air is connected, with respect to flow, to an air inlet device in the walls of the bogie cavity in such a way that the air can be blown into the bogie cavity.

10 Claims, 2 Drawing Sheets

(56) References Cited

FOREIGN PATENT DOCUMENTS

| | | |
|---|---|---|
| JP | 2005145205 A | 6/2005 |
| JP | 4614745 B2 | 1/2011 |
| JP | 2014118064 A | 6/2014 |
| JP | 2015229492 A | 12/2015 |
| RU | 2165862 C2 | 4/2001 |
| RU | 2294297 C1 | 2/2007 |
| RU | 2562815 C2 | 9/2015 |
| WO | WO 2010/026049 * | 3/2010 |
| WO | WO 2012/060139 * | 5/2012 |
| WO | 2014206643 A1 | 12/2014 |

* cited by examiner

RAIL VEHICLE HAVING A COVERED BOGIE

BACKGROUND OF THE INVENTION

Field of the Invention

The invention relates to a rail vehicle having a bogie which is covered in such a manner that there is present a bogie cavity which is formed by a covering arrangement and walls adjacent to the bogie in the under floor region of the rail vehicle, and having a device for producing pressurized air.

Such a rail vehicle is known, for example, from DE 10 2004 041 090 A1. In particular in rail vehicles which are used for high-speed travel, bogies of the rail vehicle are largely covered in order to reduce air resistance. In this instance, such a covering extends, for example, partially below a bogie frame, where applicable obliquely in an upward direction at the front or rear side of the bogie. The bogie is thus embedded in a cavity together with adjoining/adjacent walls of the rail vehicle. Depending on a fluid-tightness of this cavity, ambient air flows through it, particularly at high vehicle speeds. The high air masses guided past the bogie result in particular in air which has not previously been influenced by the rail vehicle entering the bogie cavity and resulting there in an increase of the travel resistance for the rail vehicle. This relates in particular to the first bogie when viewed in the travel direction of the rail vehicle.

In addition, the limited fluid-tightness of the bogie cavity has the disadvantage that air which is charged with dirt particles and/or (in winter) with snow particles is introduced into the bogie cavity and particles which have been introduced can become deposited at that location. This leads to an increased maintenance complexity or even to damage.

The limited fluid-tightness of the bogie cavity consequently has negative consequences both for the flow resistance of the rail vehicle, in particular when it is a high-speed vehicle, and for the maintenance complexity in the region of the bogies.

SUMMARY OF THE INVENTION

Based on this, the object of the invention is to develop a rail vehicle of the type mentioned in the introduction in such a manner that the negative consequences of the limited fluid-tightness of the bogie cavity are reduced.

This object is achieved by a rail vehicle as claimed.

Accordingly, in the rail vehicle of the type mentioned in the introduction there is provision for the device for producing pressurized air to be connected in technical flow terms to an air inlet device in the walls of the bogie cavity in such a manner that the air can be blown into the bogie cavity.

As a result of the pressurized air being blown into the bogie cavity, it is possible to increase the pressure inside the bogie cavity in such a manner that the air masses flowing through the bogie cavity are reduced. A reduction of the through flow of the cavity reduces the travel resistance. Accordingly, quantities of dust particles and, in winter, snow introduced with the air masses are also reduced.

The air inlet device provided may, for example, be provided in a base plate portion of the rail vehicle located above the bogie. In this instance, pressurized air is guided from a location of the device for producing pressurized air located at any location within the rail vehicle as far as the base plate portion and blown via the provided air inlet device into the bogie cavity.

The flow direction of the pressurized air within the bogie cavity would be substantially vertically downward in the direction toward the bogie.

In an alternative or also additional embodiment, the walls of the bogie cavity may comprise bulkheads which are located in front of and behind the bogie in the longitudinal direction of the rail vehicle, wherein the air inlet device is provided in at least one of the bulkheads. Such bulkheads are located in front of and behind the bogie typically with a substantially vertical orientation. The pressurized air which is blown in via one or both bulkheads then flows substantially horizontally along the bogie.

Regardless of the direction of the air introduction into the bogie cavity, the air inlet device may be constructed for blowing the air into the bogie cavity in a planar manner. If air is blown in via the base plate portion, for example, the entire region of the base plate which is located above the bogie can be used for blowing in air. In this instance, the air inlet device may be present in the form of a hole pattern which is formed in the base plate portion. The hole pattern may be distributed in a planar manner. Alternatively, the introduction may also involve individual pipes/nozzles, also distributed in a planar manner, one or more channels or simply a large pipe. All other type of passages (grid, etc.) are also conceivable for blowing in the pressurized air.

In the case of the (where applicable additional) air introduction via the bulkheads, the air inlet device may correspondingly be constructed as a hole pattern. This hole pattern may comprise large portions or also an entire face of the bulkhead.

Furthermore, it is possible for the air inlet device to be constructed for blowing the air into the bogie cavity in a localized manner. In this instance, a cross-section of the air masses blown in is extremely limited.

In addition, there may be provision for the air inlet device to be constructed as a nozzle which protrudes into the bogie cavity (or as a hose). In this manner, an increased air pressure can also be produced in the bogie cavity. With regard to bogie regions which are particularly at risk with regard to the accumulation of snow particles in winter, one or more such nozzles may also be directed onto bogie regions which are particularly at risk.

For the device for producing pressurized air, any available source inside a rail vehicle may be considered. Even a single fan which guides, for example, cooling air past a component of the rail vehicle which is intended to be cooled, is suitable for being used as a device for producing pressurized air. In such a case, the heated cooling air after passing the component which is intended to be cooled is guided further in the direction of the bogie cavity so that it can be blown via the air inlet device into the bogie cavity.

For example, the device for producing pressurized air is formed by an exhaust air device of an air-conditioning device of the rail vehicle. Alternatively or additionally, it is also possible for this device to be formed by a transformer cooler or a power converter cooler of the rail vehicle. In all cases for the construction of the device for producing pressurized air, the air supplied to the bogie cavity will have an increased temperature so that by means of appropriate introduction of the air, for example, via at least one nozzle, accumulations of snow in the bogie region can be reduced in a selective manner. The snow particles which have been introduced into the bogie cavity melt or snow deposits present melt as a result of an increased temperature of the pressurized air.

A side effect of the illustrated embodiments for the device for producing pressurized air is that the respective air in comparison with its conventional function fulfills another purpose. Only a suitable line arrangement is required in order to supply the air in the direction toward the bogie cavity.

The device for producing pressurized air may be controlled in such a manner that the pressure produced in the bogie cavity is at least one bar. In principle, it is desirable for the pressure inside the bogie cavity to correspond at least to the applied pressure of the ambient air since in this instance an introduction of the external air into the bogie cavity is effectively prevented. Thus, at normal pressure outside the bogie cavity of 101325 Pa, the pressure in the bogie cavity may be greater than 1018250 Pa, preferably greater than 102325 Pa and in a particularly preferred manner greater than 102825 Pa.

BRIEF DESCRIPTION OF THE SEVERAL VIEWS OF THE DRAWING

Embodiments of the invention are explained in greater detail below with reference to the drawings, wherein functionally identical components are indicated with the same reference numerals. In the drawings.

DESCRIPTION OF THE INVENTION

Figure 1:
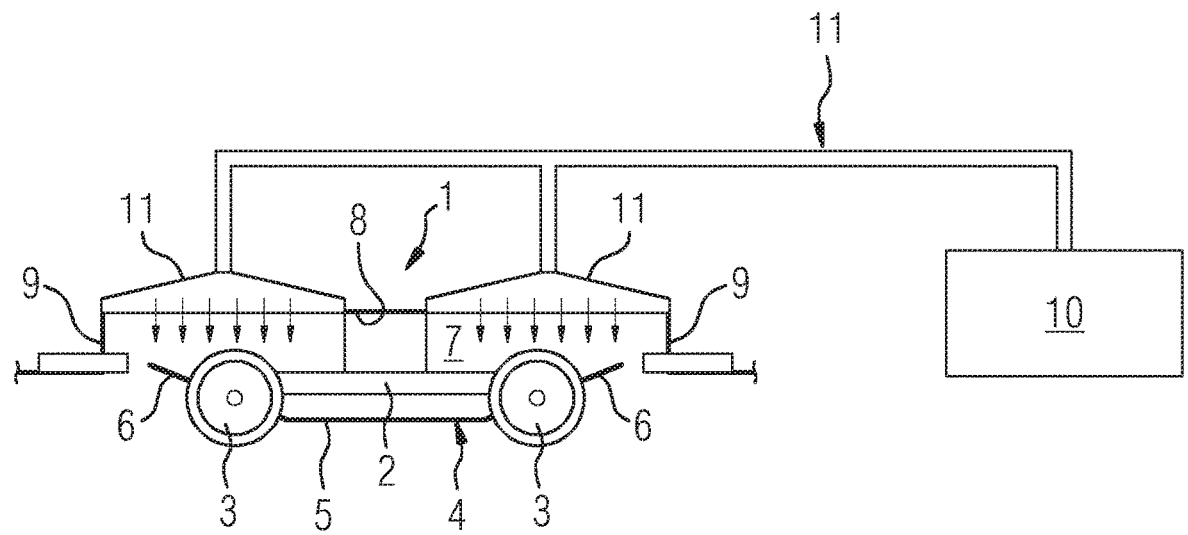
FIG. 1 is a schematic cross-sectional view of a bogie region of a rail vehicle in a first embodiment.

FIG. 1 shows a bogie region of a rail vehicle. A bogie 1 has in conventional manner a bogie frame 2 on which wheels 3 of the bogie 1 are supported. The bogie 1 is provided with a covering 4 which has an inner portion 5 which extends horizontally below the bogie frame 2 between the wheels 3 and two portions 6 which extend obliquely upward on the portion 4 in front of and behind the bogie frame 2. Using the bogie covering 4, consequently, the bogie is covered both at the bottom and at the sides so that oncoming external air can substantially still pass through only gaps between the external free edges of the covering portions 6 and the nearest region of the rail vehicle carriage body.

The bogie 1 is arranged in a bogie cavity 7 which is delimited at the bottom by the bogie covering 4. At the top, the bogie cavity 7 is delimited by a base plate portion 8 of the rail vehicle, whilst the bogie cavity 7 is formed by bulkheads 9 laterally in the longitudinal direction of the rail vehicle. The bulkheads 9 extend vertically downward and delimit the relevant base plate portion 8 in this instance in the longitudinal direction of the rail vehicle.

As a result of the above-mentioned gaps between the outer edges of the covering portions 6 and the rail vehicle carriage body, incoming external air accumulates in the bogie cavity 7 and consequently causes in particular in high-speed trains a considerable travel resistance, wherein additionally, for example, dirt particles are introduced into the bogie cavity 7.

In order to reduce the travel resistance and the introduction of dirt particles (also snow in winter), pressurized air is blown into the bogie cavity 7. In principle, all devices of the rail vehicle which generate a type of exhaust air may be considered as a source for the pressurized air. Pressurized air may also originate from a "conventional" pressurized air system, such as, for example, the main air compressor (produces compressed air for brake and pantograph, etcetera). It is further conceivable to separately install a system only for this purpose in addition if, for example, it is desirable to prevent the accumulation of snow in a selective manner. In technical travel resistance terms, however, such a procedure would potentially be disadvantageous. Examples of a device for producing pressurized air 10 are various cooling devices of the rail vehicle, such as, for example, a transformer cooler or a power converter cooler which are typically arranged below the floor of the rail vehicle and which are consequently located in the vicinity of the bogie 1. The device 10 for producing pressurized air may, however, also be formed by an exhaust air device of an air-conditioning device of the rail vehicle, which is typically located instead in the roof region of the rail vehicle. Depending on the type of device 10 used for producing pressurized air, technical flow connections to the bogie cavity 7 are intended to be produced. In the embodiment according to FIG. 1, a line arrangement 11 is located between the device 10 for producing pressurized air and, in the embodiment illustrated, two air inlet devices 11 which are arranged in the region of the base plate portion 8. The air inlet device 11 may, for example, be produced in the form of a hole pattern. The hole patterns extend over the entire base plate portion 8, which forms the upper wall of the bogie cavity 7, with the exception of a central region in which a transverse carrier of the bogie frame 2 and a secondary suspension for the rail vehicle are located. The introduction of pressurized air is thus carried out in a planar manner. The introduction of the air results in a pressure present inside the bogie cavity 7 being increased. This results in there being formed, beyond leaks of the bogie cavity 7 on an air outlet face with respect to the environment, an air cushion which reduces the introduction of external air into the bogie cavity 7 and consequently also reduces the travel resistance of the bogie 1. At the same time, an introduction of dirt or snow particles into the bogie cavity 7 is also reduced. With regard to the type of device 10 used for producing pressurized air, it should be noted that, in all the embodiments illustrated, the air has an increased temperature so that during operation of the rail vehicle in winter even snow which has already accumulated in the bogie cavity 7 can be melted and consequently at least partially removed.

Figure 2:
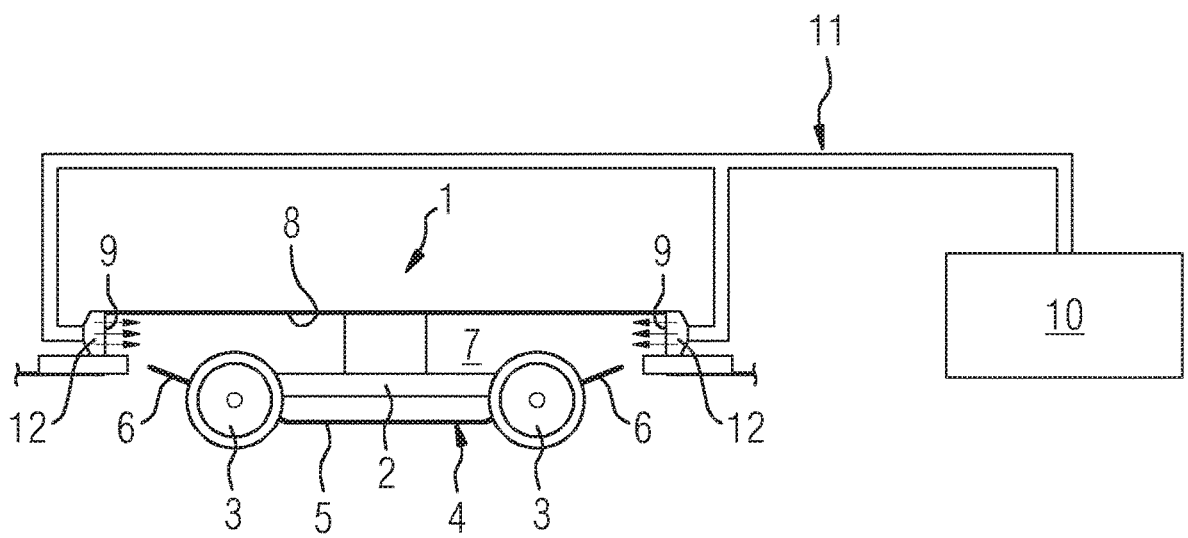
FIG. 2 is a schematic cross-sectional view of a bogie region of a rail vehicle in a second embodiment.

The embodiments illustrated with reference to FIGS. 2 to 5 have in common with the embodiment explained with reference to FIG. 1 that an introduction of pressurized air is used to generate in the bogie cavity 7 an air cushion which counteracts the introduction of external air. Modifications appear primarily in the implementation of the introduction of the pressurized air. In FIG. 2, the device 10 for producing pressurized air is connected to air inlet devices 12 which are provided in the bulkheads 9 of the bogie cavity 7. In this instance, the introduction of pressurized air is consequently carried out in a horizontal direction along the rail vehicle into the bogie cavity 7.

Figure 3:
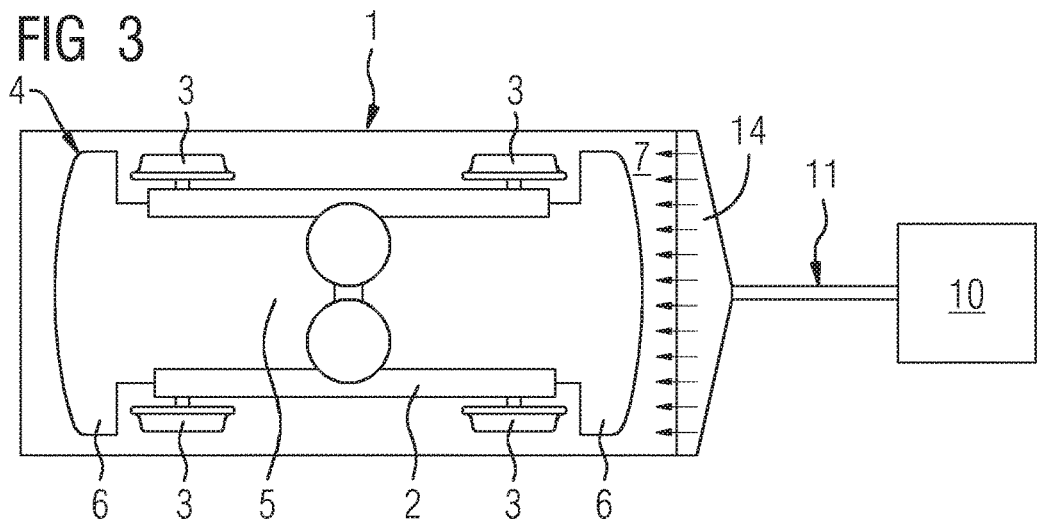
FIG. 3 is a schematic cross-sectional view of a bogie region of a rail vehicle in a third embodiment.
Figure 4:
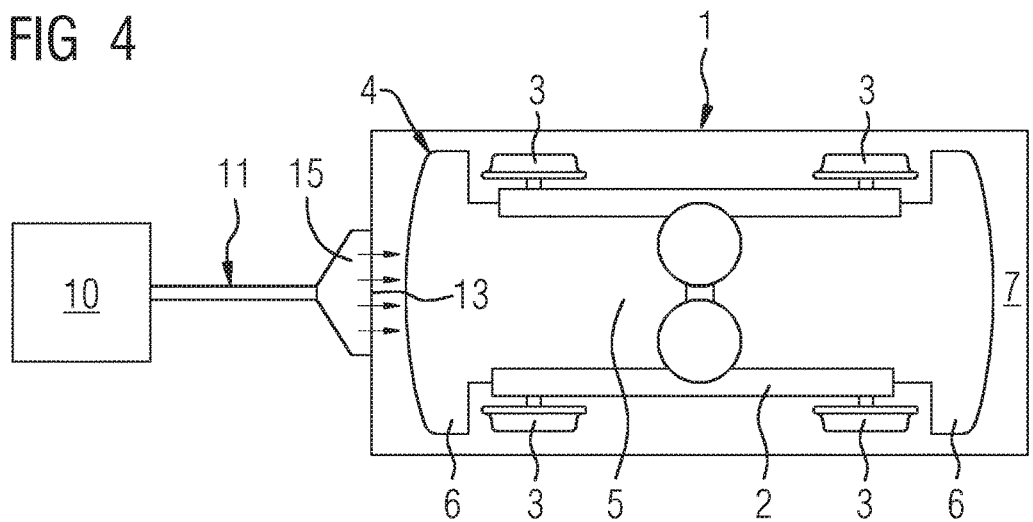
FIG. 4 is a schematic cross-sectional view of a bogie region of a rail vehicle in a fourth embodiment.

In the embodiment according to FIG. 3, the air introduction is carried out via the bulkhead 9 in a planar manner, that is to say, over the entire width and height of the bulkhead 9, whilst in FIG. 4 the introduction is carried out in a localized manner, that is to say, for example, via a region 13 which extends over less than 25% of the surface-area of the bulkhead 9. The introduction of the pressurized air is carried out in FIG. 3 using a suitably sized air inlet device 14 and in FIG. 4 with an appropriately sized air inlet device 15.

Figure 5:
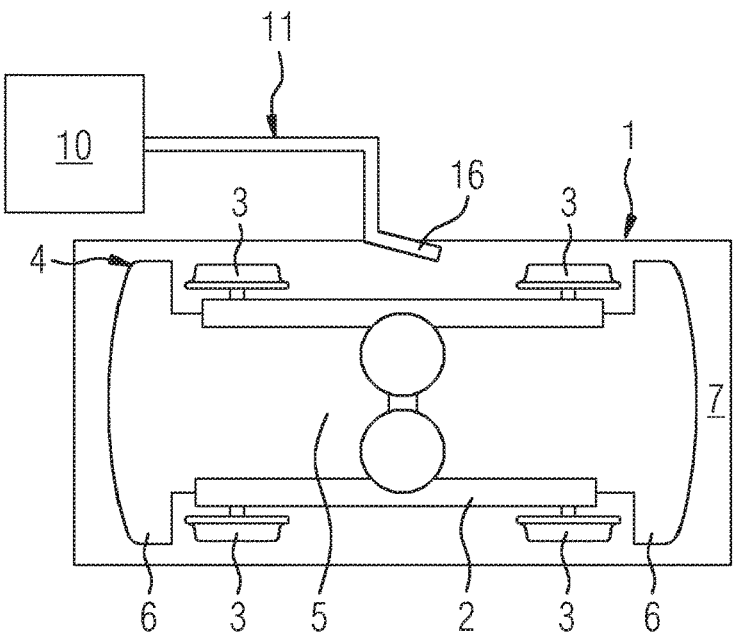
FIG. 5 is a schematic cross-sectional view of a bogie region of a rail vehicle in a fifth embodiment.

In the embodiment according to FIG. 5, the pressurized air, again produced by the device 10 and supplied to the bogie cavity via the line arrangement 11, is blown in via a nozzle 16 which protrudes into the bogie cavity 7. In this instance, the illustrated nozzle 16 is in place of a possible plurality of identical nozzles which may be directed onto the bogie regions which are particularly at risk with regard to accumulations of dirt and/or snow. The nozzle 16 may, for example, be connected to the line arrangement 11 by means of a hose portion.

All the embodiments illustrated have in common that the air resistance of the rail vehicle, in particular a vehicle for high-speed travel, is reduced. This is in principle achieved by a significantly more favorable, flow at a lower resistance around the bogie by the pressurized air produced at the vehicle side. It should additionally be emphasized that the air which is drawn in for cooling other components or for the air-conditioning system of the rail vehicle, and which is consequently resistance-neutral during further use, is used again in order to reduce the air resistance and to bring about the aerodynamic protection against contamination of the bogie cavity 7.

The invention claimed is:

1. A rail vehicle, comprising:
   a bogie;
   a covering arrangement and walls adjacent said bogie in an under floor region of the rail vehicle;
   said covering arrangement and said walls together forming a bogie cavity;
   an air inlet device formed in said walls of said bogie cavity;
   a device for producing pressurized air connected to fluidically communicate with said air inlet device, said device being configured for providing pressurized air with an increased temperature to be blown into said bogie cavity such that added heat is provided for increasing the temperature in said bogie cavity, said device for producing pressurized air controllable such that a pressure produced in said bogie cavity is greater than an exterior ambient pressure outside of said bogie cavity.

2. The rail vehicle according to claim 1, wherein the rail vehicle has a base plate forming an upper wall of said walls of said bogie cavity and said air inlet device is formed in a portion of the base plate located above said bogie.

3. The rail vehicle according to claim 1, wherein said walls of said bogie cavity comprise bulkheads disposed forward of said bogie and rearward of said bogie in a longitudinal direction of the rail vehicle, and wherein said air inlet device is provided in at least one of said bulkheads.

4. The rail vehicle according to claim 1, wherein said air inlet device is configured for blowing the air into said bogie cavity in a planar manner.

5. The rail vehicle according to claim 1, wherein said air inlet device is configured for blowing the air into said bogie cavity in a punctiform localized manner.

6. The rail vehicle according to claim 1, wherein said air inlet device is a nozzle that projects into said bogie cavity.

7. The rail vehicle according to claim 1, wherein said device for producing pressurized air is an exhaust air device of an air-conditioning system of the rail vehicle.

8. The rail vehicle according to claim 1, wherein said device for producing pressurized air is a transformer cooler of the rail vehicle.

9. The rail vehicle according to claim 1, wherein said device for producing pressurized air is a power converter cooler of the rail vehicle.

10. The rail vehicle according to claim 1, wherein the pressurized air is derived from spent air from cooling other components of the rail vehicle and is resistance neutral during further use thereof.

* * * * *